(12) United States Patent
Carter

(10) Patent No.: US 9,404,477 B2
(45) Date of Patent: Aug. 2, 2016

(54) PROPORTIONAL MOVING AIR POWER TRANSMISSION AND ENERGY COLLECTION AND CONTROL SYSTEM

(71) Applicant: Jerry Austin Carter, Sana Ana, CA (US)

(72) Inventor: Jerry Austin Carter, Sana Ana, CA (US)

(*) Notice: Subject to any disclaimer, the term of this patent is extended or adjusted under 35 U.S.C. 154(b) by 26 days.

(21) Appl. No.: 14/300,199

(22) Filed: Jun. 9, 2014

(65) Prior Publication Data

US 2014/0361539 A1    Dec. 11, 2014

Related U.S. Application Data

(60) Provisional application No. 61/833,272, filed on Jun. 10, 2013.

(51) Int. Cl.
*F03D 7/00* (2006.01)
*F03D 3/06* (2006.01)
*F03D 7/06* (2006.01)

(52) U.S. Cl.
CPC *F03D 3/065* (2013.01); *F03D 7/06* (2013.01); *F05B 2260/71* (2013.01); *F05B 2260/72* (2013.01); *F05B 2260/76* (2013.01); *Y02E 10/74* (2013.01)

(58) Field of Classification Search
CPC .......................................................... F03D 7/00
USPC ................................................ 416/52; 290/55
See application file for complete search history.

(56) References Cited

U.S. PATENT DOCUMENTS

| | | | | |
|---|---|---|---|---|
| 1,850,721 | A * | 3/1932 | Katzenberger | 416/52 |
| 3,995,170 | A * | 11/1976 | Graybill | 290/55 |
| 4,776,762 | A * | 10/1988 | Blowers, Sr. | F03D 3/068 416/119 |
| 5,425,619 | A * | 6/1995 | Aylor | 416/42 |
| 5,553,996 | A * | 9/1996 | Farrar | 415/2.1 |
| 7,083,382 | B2 * | 8/2006 | Ursua | 416/110 |
| 8,038,384 | B2 * | 10/2011 | Brown | 415/4.2 |
| 2005/0169742 | A1 * | 8/2005 | Kane | F03D 3/061 415/4.4 |
| 2009/0236858 | A1 * | 9/2009 | Johnson | 290/55 |

* cited by examiner

*Primary Examiner* — Joseph Waks
(74) *Attorney, Agent, or Firm* — Raymond Y. Chan; David and Raymond Patent Firm

(57) ABSTRACT

A proportional moving air power transmission and energy collection and control system includes a fixed vertical spindle, a vertical rotational hub and a plurality of wings being supported around the vertical hub in 360°. Each of the wings has a blunt leading end and a pointy trailing end and defining an outer surface and an inner surface. In a fully opened position, the trailing end of each wing is moved away from the vertical hub to a diameter of the wing assembly to drive the vertical hub to rotate. In a fully closed position, the wings are overlapped with each other end-to-end to form a hollow cylinder-like structure to furl, such that the diameter of the wing assembly is minimized for facing the wind at all direction.

20 Claims, 5 Drawing Sheets

PROPORTIONAL MOVING AIR POWER TRANSMISSION AND ENERGY COLLECTION AND CONTROL SYSTEM

CROSS REFERENCE OF RELATED APPLICATION

This is a non-provisional application that claims the benefit of priority under 35 U.S.C. §119 to a provisional application, application No. 61/833,272, filed Jun. 10, 2013.

NOTICE OF COPYRIGHT

A portion of the disclosure of this patent document contains material which is to subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to an energy generator, and more particular to a proportional moving air power transmission and energy collection and control system, which can operate in any wind speed, especially in extremely high wind environment, to efficiently transform wind power into electrical power while being cost effective.

2. Description of Related Arts

Many periodicals, letters, and books note the negatives for vertical axis wind turbines (VAWT) but seldom identify negatives for horizontal axis wind turbines (HAWT). The existing HAWT has very long cantilever blades attached on one end only.

Accordingly, furling refers to storing or securing sails or flags out of the wind. For turbines, it is the function of shutting down and turning to reduce damage forces of high winds.

HAWT furl by braking and stopping the turbine, rotating the blades to neutral and rotating the complete head, blades and power house broadside to the wind. The top of a HAWT is very heavy and does not rotate rapidly. Twenty three of twenty five San Diego Gas and Electric turbines, fifty miles east of San Diego were damaged by a seventy mile per hour wind gust that they could not furl fast enough to avoid.

Existing horizontal wind turbines have very high maintenance and capital costs. They are very tall structures and cumbersome. They are not able to avoid extremely high winds and are often damaged. In other words, limited sites with consistent high wind is one of the major drawbacks for the HAWTs. They are inefficient producing electrical power. HAWTs rotors are mounted on lubricated steel bearings driving alternators through gear boxes all located hundreds of feet above ground.

Horizontal axis wind turbines are very tall with the power unit over 200 feet high making it very difficult to service. There are many other problems. HAWTs kill birds. The blades tips for a one hundred fifty foot blade at only fifteen RPM travel at one hundred sixty miles per hour and rotate perpendicular to the flow of the wind, which is typically the direction of bird flight. Birds traveling twenty miles per hour are boardsided by a blade. At the blade tip is created a vortex wind of 170 to 200 MPH which damages the bird's raspatory system and the bird suffers a horrible death. This vortex is the sound of the turbine.

The state of the art and design data are incorrect but followed by manufacturers. Without government incentives, horizontal turbine costs and high maintenance would prohibit their use. Many horizontal turbines are dormant since it is too expensive to repair them.

SUMMARY OF THE PRESENT INVENTION

The invention is advantageous in that it provides a proportional moving air power transmission and energy collection and control system, which can operate in any wind speed, especially in extremely high wind environment, to efficiently transform wind power into electrical power while being cost effective.

Another advantage of the invention is to a proportional moving air power transmission and energy collection and control system, which provides a pitch control of the wings on a VAWT. In particular, it is also adapted to furl the wings of the system in extreme winds and during maintenance. Accordingly, the control system is arranged to control a variable pitch VAWT according to various wind conditions in order to harvest maximum energy from the wind.

Another advantage of the invention is to a proportional moving air power transmission and energy collection and control system, wherein the variable speed alternator produces a constant grid synchronic voltage and variable current.

Another advantage of the invention is to a proportional moving air power transmission and energy collection and control system, which provides a meteorological monitoring system for interface with the VAWT pitch control.

Another advantage of the invention is to a proportional moving air power transmission and energy collection and control system which is not based on the data and does not have axle for HAWT.

Another advantage of the invention is to a proportional moving air power transmission and energy collection and control system, which solves the existing problems of the existing horizontal wind turbines, including very high maintenance and capital cost, very tall structures and cumbersome, and non-operatable in high wind environment.

Another advantage of the invention is to a proportional moving air power transmission and energy collection and control system, wherein wings are attached at both ends requiring less structure, less weight for comparable structural integrity comparing to the conventional HAWT which has very long cantilever blades attached on one end only.

Another advantage of the invention is to a proportional moving air power transmission and energy collection and control system, which improves vertical axis wind turbine design to make a machine, superior to all other designs, with low cost and near no maintenance and high efficiency. It can quickly furl to protect it in extremely high winds.

Another advantage of the invention is to a proportional moving air power transmission and energy collection and control system, which can operate in any wind condition, from 5 MPH to 80 MPH. No erection equipment is required. The present invention makes relatively little noise and does not kill birds.

Additional advantages and features of the invention will become apparent from the description which follows, and may be realized by means of the instrumentalities and combinations particularly point out in the appended claims.

According to the present invention, the foregoing and other objects and advantages are attained by a proportional moving air power transmission and energy collection and control system, comprising:

a tower having an upper tower section and a lower base section;

a hub assembly which comprises a fixed vertical spindle provided at the top of the tower, a vertical hub coaxially supported to be rotated about the spindle, and a drive shaft coaxially provided in the spindle and attached to the top of the hub;

a wing assembly, which is supported at the tower section of the tower, comprising a plurality of wings, each of the wings having a blunt leading end and a pointy trailing end and defining an outer surface and an inner surface;

a plurality of wing connection units radially and outwardly extended from the vertical hub to couple with the wings respectively so as to support the wings around the vertical hub in 360°, wherein the wing connection units are actuated to selectively and simultaneously adjust pitches of the wings and to move the wing assembly between a fully opened position and a fully closed position, wherein in the fully opened position, the trailing end of each of the wings is moved away from the vertical hub to maximize a diameter of the wing assembly to drive the vertical hub to rotate, wherein in the fully closed position, the wings are overlapped with each other in an end-to-end manner that the trailing end of the wing is moved to overlap with the leading end of the adjacent wing to form a hollow cylinder-like structure to furl; and an energy collection unit located at the base section of the tower and operatively linked to the vertical hub for transforming the wind energy into a renewable energy.

In accordance with another aspect of the invention, the present invention comprises a method of transforming wind energy into renewable energy via a proportional moving air power transmission and energy collection and control system, comprising the following steps.

(A) Install a tower on a ground, the tower having an upper tower section and a lower base section.

(B) Vertically extend a vertical hub of a hub assembly from the top of the tower section of the tower.

(C) Support a plurality of wings of a wing assembly at the tower section of the tower, each of the wings having a blunt leading end and a pointy trailing end and defining an outer surface and an inner surface.

(D) Radially and outwardly extend a plurality of wing connection units from the vertical hub to couple with the wings respectively so as to support the wings around the vertical hub in 360°.

(E) In a low-wind environment, move the wing assembly in a fully opened position that the trailing end of each of the wings is moved away from the vertical hub via the wing connection unit to maximize a diameter of the wing assembly to drive the vertical hub to rotate.

(F) In a high-wind environment, move the wing assembly in a fully closed position that the wings are overlapped with each other end-to-end by overlapping the trailing end of the wing with the leading end of the adjacent wing to form a hollow cylinder-like structure to furl, such that the diameter of the wing assembly is minimized.

(G) In a mid-wind environment, move the wing assembly between the fully opened position and the fully closed position to selectively adjust pitches of the wings in response to a wind speed to drive the vertical hub to rotate.

(H) Transform mechanical energy produced by the vertical hub in response to the wind into the renewable energy via an energy collection unit located at the base section of the tower.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
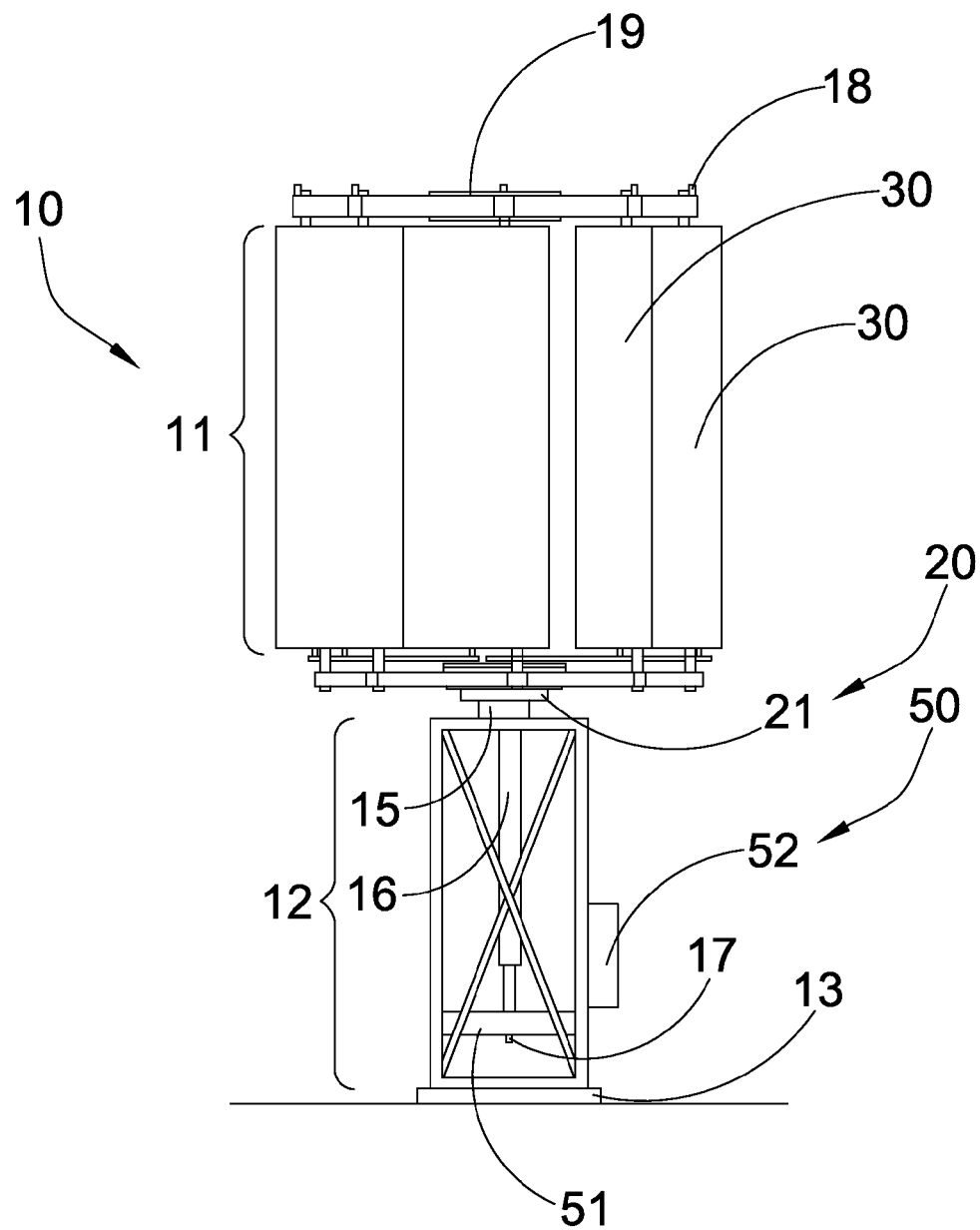
FIG. 1 is a schematic view of a proportional moving air power transmission and energy collection and control system according to a preferred embodiment of the present invention.

Referring to FIG. 1 of the drawings, a proportional moving air power transmission and energy collection and control system according to a preferred embodiment of the present invention is illustrated, wherein the system of the present invention is adapted for transforming wind energy into renewable energy.

The system according to the preferred embodiment is a hub assembly that spins on a fixed spindle with spokes 41 at the top and bottom of the machine. Wings very similar to aircraft wings are attached between these spokes 41 and pivot controlled by a furling apparatus. The relative light turbine assembly is mounted on a tower. At the base of the tower, ground level, is the alternator or any power collection device.

According to the preferred embodiment, the system, also refers as a machine, comprises a tower 10, a hub assembly 20, a wing assembly, a plurality of wing connection units 40, and an energy collection unit 50. The invention is a vertical wind driven power collection device with variable pitch wings in place of blades. The operational principles are based on Bernoulli's principle instead of Savonius or Darrieus.

Accordingly, Bernoulli's principle is the concept that an increase in liquid's speed creates a pressure decrease and a decrease in a liquid's speed creates a pressure increase.

As shown in FIG. 1, the tower 10 has an upper tower section 11 and a lower base section 12. Accordingly, the tower section 11 is tubular or lased and is modular with combination hinge/attachment on each end. The base section 12 of the tower 10 includes attachments for the energy collection unit 50 or other power generation equipment and the controls. The total tower may be one section, base, module and top. The tower 10 can be installed on a ground surface as an example. The tower 10 further comprises a foundation frame 13 which comprises earth anchors and tower attachments. The earth anchors on the foundation frame 13 are piers set in concrete as required by each machine and the soil in which it is anchored. The base section 12 is pinned in all four corners to the foundation frame 13. Two or more tower sections 11, as many as are required, reach the height necessary as pinned in four corners except for the bottom section which is pinned to the base section 12 on one side only and laid horizontal for assembly. The two pins constitute a hinge. Accordingly, when the tower 10 is installed at a ridgeline, the tower 10 can be, for example, twenty feet tall. When the tower 10 is installed on the ground level, the tower 10 can be forty feet tall or taller. It is worth mentioning that the tower 10 can be floated on the sea level by providing a floating mechanism at the base section 12 of the tower 10.

The hub assembly 20 comprises a fixed spindle 15, a drive shaft 16 and a vertical hub 21, as shown in FIG. 1. The fixed spindle 15 is vertically extended to the top of the upper tower section 11 of the tower 10. The drive shaft 16 connects the vertical hub 21 at the top of the tower 10 to the energy collection unit 50 in the lower base section 12 of the tower 10.

The fixed spindle 15 is made of thick wall tube and includes bearing race rings near each end thereof. An attachment is welded on one end of the spindle 15 with a large hole in the middle. The other end of the spindle is affixed by welding to the top end of the tower section 11. The top section of the spindle 15 is pinned on all four corners. Angular thrust bearing assemblies are attached to the top section of the spindle 15.

The vertical hub 21 is made of a thin wall large diameter tube. Upper and lower receiver hubs are respectively affixed by welding at two ends of the vertical hub 21 with the number of receiver sockets for the spokes 41 of the machine. A cap covers one end for attachments for the angular thrust bearing assemblies. Attachments at each end of the hub 21 are for radial bearings. A flat bearing race is affixed by welding to the cover. Port holes are in the side of the vertical hub 21 to access the bearings.

The vertical hub 21 is installed over the spindle 15. The drive shaft 16 with a slip joint and universal joints one each end. The hollow drive shaft 16 is attached to the top cover of the vertical hub 21. The drive shaft 16 transmits the rotational motion from the vertical hub 21 and the wing assembly to the energy collection unit 50. Accordingly, the control 52, including remote control sensors, is connected with an electric cable through the hollow drive shaft 16.

The hub assembly 20 further comprises a pitch drive ring 22 coaxially and rotatably coupled around the vertical hub 21, and a bearing ring 23 coaxially coupled between an outer surface of the vertical hub 21 and an inner surface of the pitch drive ring 22. An angular roller including bearings is mounted in an angular bracket. A straight sided roller including bearings is mounted in a bracket. The side bearings are installed through the access ports. The bearing ring 23 and pitch drive ring 22 are installed on top of the lower receiver hub of the vertical hub 21.

The pitch drive ring 22 is made in two 180-degrees segments, attachable. The inner diameter of the pitch drive ring 22 is larger than the outer diameter of the vertical hub 21. Preferably, the inner diameter of the pitch drive ring 22 is the same as the outer diameter of the vertical hub 21 plus a minimum of a one inch. The outer diameter of the pitch drive ring 22 is larger than the inner diameter of the pitch drive ring 22. Preferably, the outer diameter of the pitch drive ring 22 is equal to the inner diameter of the pitch drive ring 22 plus at least four inches. A number of holes equidistant around the pitch drive ring 22 are drilled and taped. An additional hole is drilled and taped between two of the other holes.

The bearing ring 23 is made of plastic bearing material with the inner diameter equal to the outer diameter of the vertical hub 21. The outer diameter of the bearing ring 23 is the same as the inner diameter of the pitch drive ring 22. A ridge on the inner diameter of the bearing ring 23 centers the pitch drive ring 22. The bearing rings 23 enables the pitch drive ring 22 to rotate around the vertical hub 21 smoothly.

The wing assembly, which is supported at the tower section 11 of the tower 10, comprises a plurality of wings (or blades) 30. Each of the wings 30 has a blunt leading end 31 and a pointy trailing end 32 and defining an outer surface 33 and an inner surface 34. The preferred number of wings 30 is eight and may be any number. The outer surface 33 of the wing 30 faces away from the hub assembly 20 and the inner surface 34 of the wing 30 faces toward the hub assembly 20.

Figure 2:
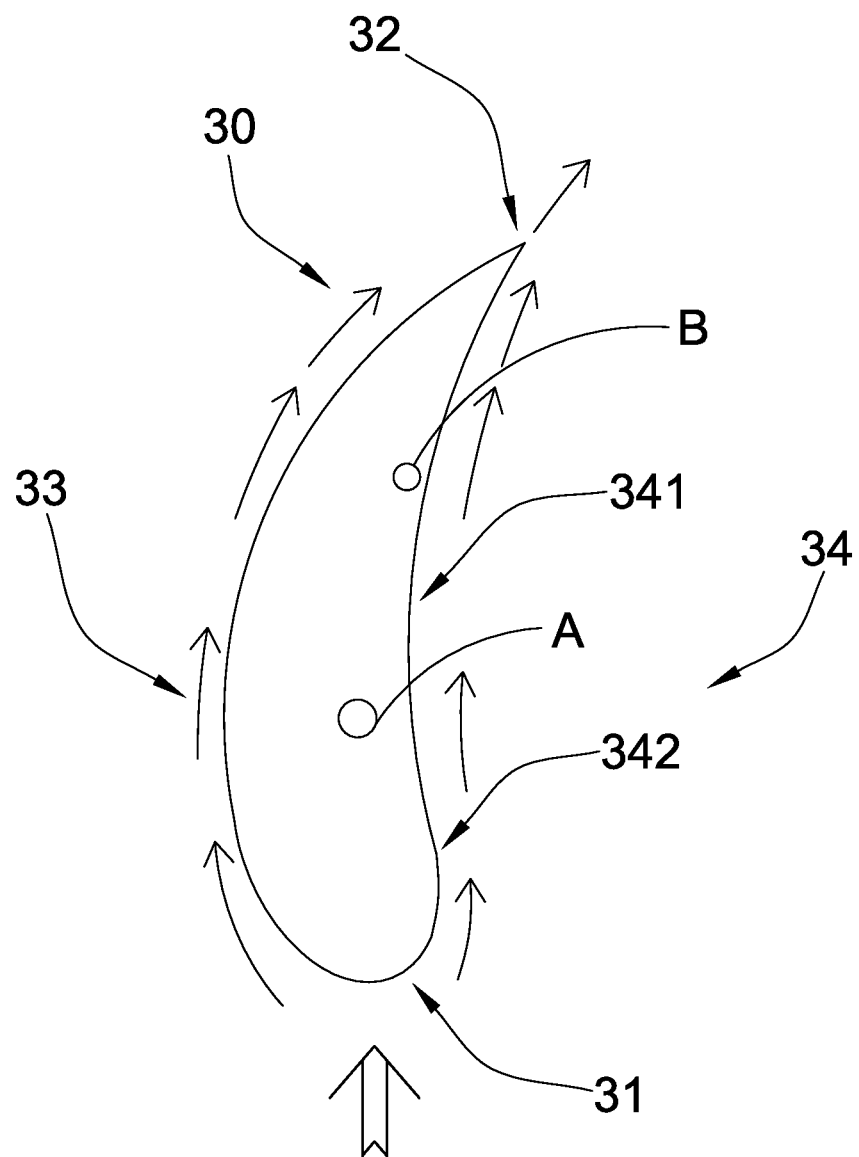
FIG. 2 is a schematic view of a wing profile of the proportional moving air power transmission and energy collection and control system according to the above preferred embodiment of the present invention.

FIG. 2 is the wing profile preferred. The wing 30 with an overall curved cord. The underside is primarily concave. A portion of the underside is convex from the leading end 31 and a minor portion is convex at the trailing end 32. The leading end 31 is blunt. The wing 30 is thick with a continuous curve over the top camber to the trailing end 32. The length of the wing 30 may be any length. The preferred length is two to four times the width. The wing 30 reduced to practice is forty-two inches wide and 144 inches long. The wing point A and the link attachment point B are provided at the wing 30. The wing 30 is truly a high lift or aircraft type wing. Generally, the outer surface 33 of the wing 30 is a convex surface and the inner surface 34 of the wing 30 is a concave surface.

In particular, the width of each of the wings 30 is defined between the inner surface 34 and the outer surface 33 that the width at the leading end 31 is larger than the width at the trailing end 32. The inner surface 34 of each of the wings 30 is configured to have a concave portion 341 extended from the trailing end 32 and a convex portion 342 extended from the leading end 31 to the concave portion 341. Alternatively, the inner surface 34 of each of the wings 30 can be a flat and non-curved surface extended between the leading end 31 and the trailing end 32. The outer surface 33 of each of the wings 30 is configured to have a convex surface. The curvature of the outer surface 33 of each of the wings 30 is different from the curvature of the concave portion 341 of the inner surface 34 of each of the wings 30. In other words, the wings 30 have an airfoil shape that a streamlined cross section shape to produce a lift to drag ratio.

According to the Bernoulli's principle, the shape of each of the wings 30 causes to travel for a longer period at the outer surface 33 from the leading end 31 to the trailing end 32, causing air to travel faster, reducing the air pressure and creating lift, as compared to the distance traveled, the air speed and the air pressure experienced at the inner surface 34 of the wing 30. In other words, when the air flow passes through the wing assembly, a pressure difference is created at each of the wings 30 to drive vertical hub 21 to rotate. Therefore, the pressure difference results in a driving force to drive the wing assembly to rotate around the hub assembly.

Each of the wings 30 has a predetermined height, i.e. the vertical height parallel to the vertical axis of the vertical hub 21. When the wing 30 has a dimension of 12 feet long and 3.5 wide, 10 kilowatt of electrical energy can be generated. When wing 30 has a dimension of 82 feet long and 20 wide, 1 megawatt of electrical energy can be generated.

Figure 3:
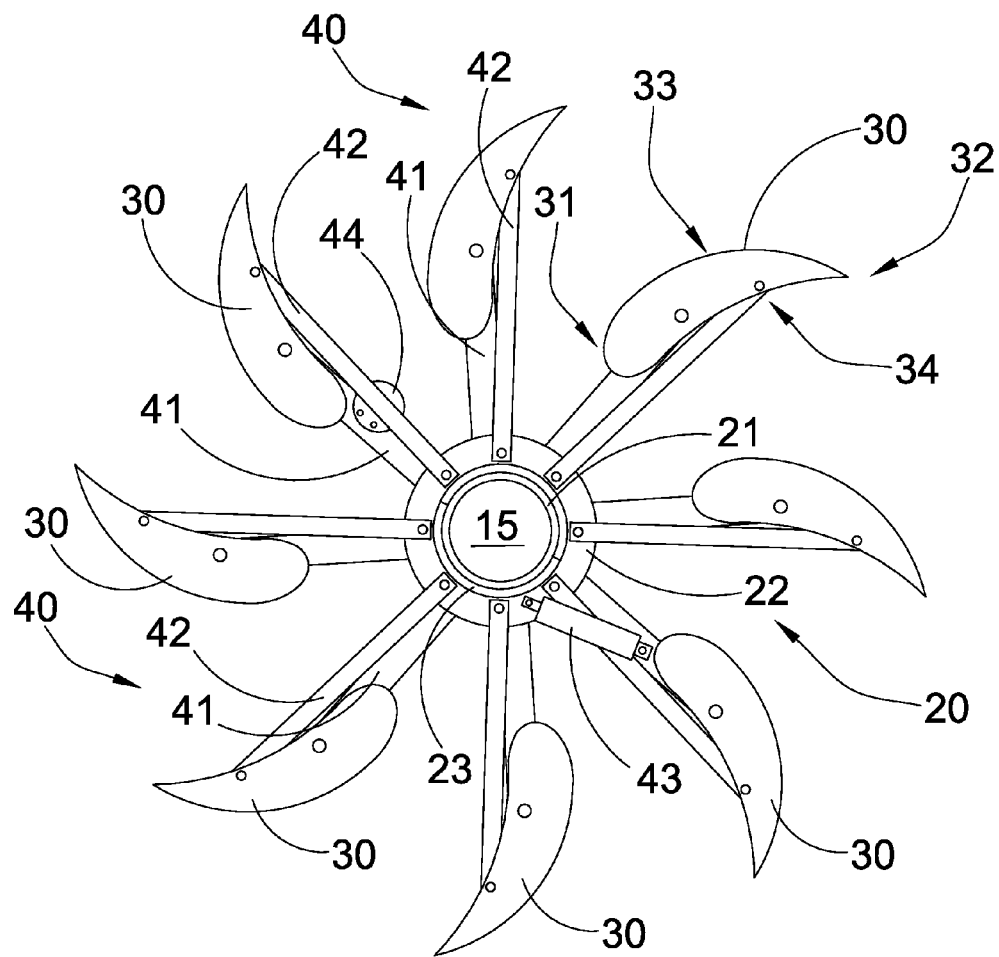
FIG. 3 illustrates the wing assembly in the fully opened position according to the above preferred embodiment of the present invention.
Figure 4:
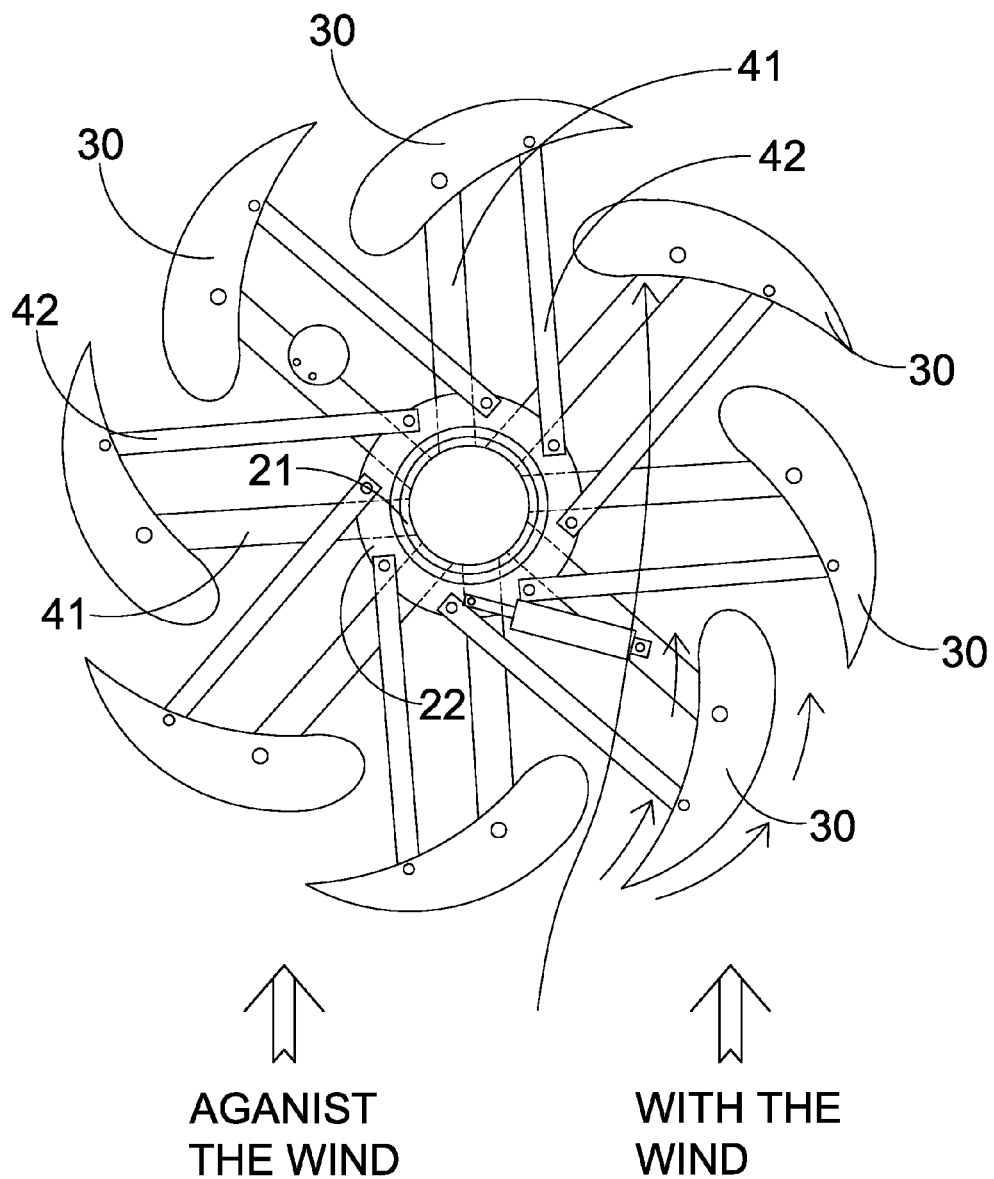
FIG. 4 illustrates the wing assembly being moved between the fully opened position and the fully closed position according to the above preferred embodiment of the present invention.
Figure 5:
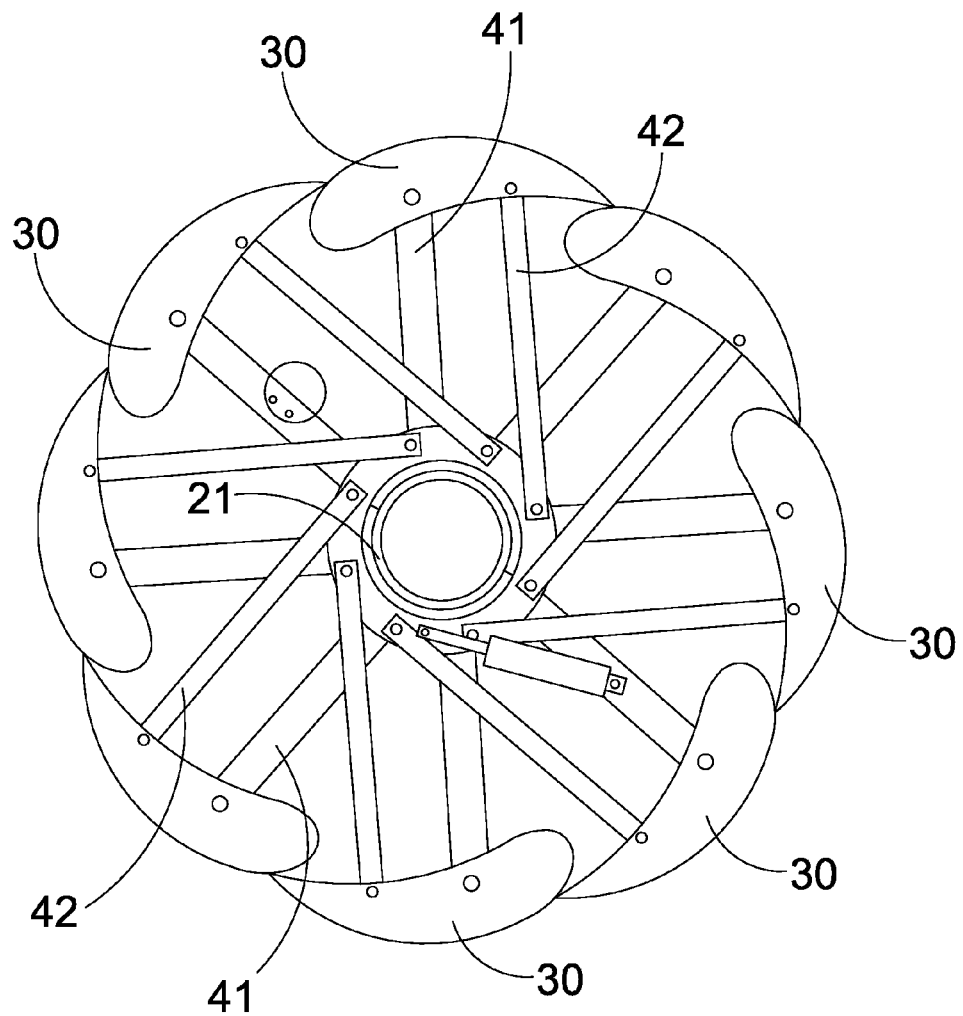
FIG. 5 illustrates the wing assembly in the fully closed position according to the above preferred embodiment of the present invention.

As shown in FIGS. 3 to 5, the wing connection units 40 are radially and outwardly extended from the vertical hub 21 to couple with the wings 30 respectively so as to support the wings 30 around the vertical hub 21 in 360°, wherein the wing connection units 40 are actuated to selectively adjust pitches of the wings 30 and to move the wing assembly between a fully opened position and a fully closed position.

In a low-wind environment, such as the wind speed at 5 to 6 MPH, the wing assembly is moved in the fully opened position, as shown in FIG. 3. In a high-wind environment, such as the wind speed at 60 to 70 MPH, the wing assembly is moved in the fully closed position, as shown in FIG. 5. In a mid-to-high wind environment (normal condition), the wing assembly is moved between the fully closed position and the fully opened position, as shown in FIG. 4. The pitches of the wings 30 are selectively adjusted between the fully closed position and the fully opened position. Preferably, the wing assembly is optimized to operate with the wind speed about 20 to 30 MPH. It is worth mentioning that the wing assembly of the present invention can work at all directions of wind.

Accordingly, in the fully opened position, the trailing end 32 of each of the wings 30 is moved away from the vertical hub 21 to maximize the diameter of the wing assembly to drive the vertical hub 21 to rotate. The wings 30 are fully opened to enable the wings 30 to collect great amount of wind via the inner surfaces 34 of the wings 30.

In the fully closed position, the wings 30 are overlapped with each other end-to-end that the trailing end 32 of the wing 30 is moved to overlap with the leading end 31 of the adjacent wing 30 to form a hollow cylinder-like structure to furl, such that the outer surfaces 33 of the wings 30 are maximized. In other words, the wings 30 are closed to produce a solid cylindrical object since the wings 30 slightly overlap to minimize the diameter of the wing assembly. The preferred turbine furls the most efficient wings 30. The wings 30 may be designed to form a smooth sided cylindrical object and spaced to furl so that the wings 30 align along the periphery of the wing assembly.

Accordingly, the wing connection units 40 can pivot the wings 30 which overlap each other to producing a reduced diameter round object. Since each wing 30 is light, it pivots rapidly and is able to furl in a very short time. Since the wing assembly can close up in high winds, it is not necessary to close completely allowing it to produce power in high winds. A control, monitors the wind conditions and adjusts the wings accordingly, regardless of wind intensity. As long as the present invention is built to withstand high winds, there is no reason not to draw power from it. However, the existing HAWTs shut down at the wind speed of 28 MPH. The present invention never shuts down.

As shown in FIGS. 3 to 5, each of the wing connection units 40 is coupled at the inner surface 34 of the wing 30. In particular, each of the wing connection units 40 comprises a spoke 41 extended from the vertical hub 21 to pivotally couple at the corresponding wing 30 to support the wing 30 around the vertical hub 21, and a link 42 pivotally extended from the pitch drive ring 22 to pivotally couple at the corresponding wing 30 to selectively adjust the pitch of the wing 30 when the pitch drive ring 22 is rotated around the vertical hub 21.

Accordingly, the spoke 41 is tubular strong enough and long enough for the size of the machine. There are anchor holes in one end and a bearing socket in the other end. The inner end of each of the spokes 41 is affixed to the vertical hub while an outer end of each of the spokes 41 is pivotally connected to the corresponding wing 30 close to the leading end 31 thereof. In particular, the outer end of each of the spoke 41 is pivotally connected at the wing point A of the corresponding wing 30. Preferably, the spokes 41 are threaded onto each end of the wing 30. The assemblies are then plugged into the upper and lower receiver hubs of the vertical hub 21. The spokes 41 are fastened with bolts.

The link 42 is tubular of sufficient length and strength for the size of the machine. There are bearing sockets at each end on the same plane. The inner end of each of the links 42 is pivotally connected to the pitch drive ring 22 while the outer end of each of the links 42 is pivotally connected to the corresponding wing 30 close to the trailing end 32 thereof. In particular, the outer end of each of the links is pivotally connected to the link attachment point B of the corresponding wing 30 to selectively adjust the pitch of the wing 30.

Accordingly, when the pitch drive ring 22 is rotated at one direction, the links 42 are actuated to pull the trailing ends 32 of the wings 30 toward the vertical hub 21. Therefore, by controlling the angular movement of the pitch drive ring 22, the trailing ends 32 of the wings 30 are pulled to overlap with the leading ends 31 of the consequent wings 30 so as to move the wing assembly in the fully closed position. It is worth mentioning that the inner surface 34 of the wing 30 at the trailing end 32 thereof is overlapped and contacted with the outer surface 33 of the adjacent wing 30 at the leading end 31 thereof. In other words, the inner surfaces 34 of the wings 30 are hidden within hollow cylinder-like structure to prevent any wind directly exerting on the inner surfaces 34 of the wings 30. As a result, the wings 30 will form the hollow cylinder-like structure to furl. The wings 30 are required to close completely to furl but may open at different pitches.

When the pitch drive ring 22 is rotated at an opposite direction, the links 42 are actuated to push the trailing ends 32 of the wings 30 away from the vertical hub 21. Therefore, by controlling the angular movement of the pitch drive ring 22, the trailing ends 32 of the wings 30 are pushed until the wings 30 are fully extended from the vertical hub 21. The maximum of the wing 30 is the length of the link 42 being radially extended from the pitch drive ring 22 as shown in FIG. 3. It is worth mentioning that the system of the present invention may be equipped with 8 wings, 16 wings, or 24 wings in its present configuration.

Furthermore, the pitches of the wings 30 are selectively adjusted by the angular movement of the pitch drive ring 22. Through the pitch drive ring 22, the wings 30 are moved in a synchronized manner. In other words, the wings 30 are moved concurrently with the same pitch and all change pitches of the wings 30 the same simultaneously. It is appreciated that the wings 30 may be pitched individually with pneumatics, hydraulics or mechanical screw driver or any other drive system. For example, a plurality of pitch drive rings 22 are provided at the vertical hub 21 to operatively link to the links 42 respectively. Therefore, each of the pitch drive rings 22 is controllably rotated to selectively adjust the pitch of the particular wing 30. Many change pitch according to a cam sequentially.

The wings pitch is variable and by control based on various input data, the wings 30 are pitched proportional to wind conditions as determined by a control system. This pitch control maximizes the power transmission frame the air flow around and through it. The pitch is proportional to the wind speed, air temperature and humidity, density, and hub assembly rotational speed.

Accordingly, the present invention is assumed by some critics inherently inefficient since during rotation, half of the wing assembly is traveling with the wind and half of the wing assembly is traveling against the wind. In other words, numbers of wings 30 are traveling with the wind and numbers of wings 30 are traveling against the wind. However, it is an advantage. As any sailor or aviator would recognize, the wing angular to the wind produces lift and in this case, drive. The side rotating with the wind produces less power. On the other hand, HAWTs actually require input power to start the rotors turning in order to produce the lift in conjunction with the wind to produce power. Therefore, the system of the present invention does not require any initial power to start the rotation of the vertical hub 21.

A study by O. Agren and M. Legion of the American Institute of Physics addresses this phenomenon for open VAWTS. The system is closed resulting in low speed high torque like a Savonius turbine and high speed efficiency of a Darreius turbine making this design omni-directional and self starting requiring no external power to operate.

Again, HAWTs are not omni-directional as VAWTs are. The blades, rotor, and power house of the HAWT must rotate to face the wind to operate. HAWTs produce a vortex in the wind causing buffeting and turbulence following the turbine. The flow through the invention is laminar, slightly pulsed and quickly smoothed with no vortex.

The wing connection units 40 further comprises a linear actuator 43 attached to one spoke 41, wherein the linear actuator 43 with sufficient strength and stroke. The rod is attached to the additional hole on the pitch drive ring 22. A counterweight 44 of the same weight as the linear actuator 43 to balance the linear actuator 43.

The energy collection unit 50 is located at the base section 12 of the tower 10 and is operatively linked to the vertical hub 21 for transforming the wind energy into the renewable energy.

The energy collection unit 50 comprises an alternator 51 operatively linked to the vertical hub 21 for transforming mechanical energy produced by the vertical hub 21 and the wing assembly into an AC electrical energy, and a control 52 operatively linked to the alternator for converting the AC electrical energy into a DC electrical energy.

The alternator 51 has many coils and magnets in a large diameter layout. It is modular and may be made up of several sections. The alternator 51 may be driven through a gear box, fluid transmission or as preferred, directly. It may be any diameter with any pick up coils and magnets, the preferred is permanent magnets and coreless coils.

The control 52 converts power produced by the alternator 51 from AC current to DC current to AC grid synchronism current. The control 52 includes wiring, recording equipment and various sensing devices providing intelligence to the control. The electrical energy produced by the wind driven alternator 51 is also controlled by the control 52. The control 52 will control the pitches of the wings 30 via the angular movement of the pitch drive ring 22 by detecting the wind speed, air temperature and humidity, density, and hub rotational speed via different environmental sensors. The pitches of the wings 30 can also be determined from the alternator 51 to calculate the wind speed and rotational speed of the vertical hub 21.

An erection apparatus is used to erect the machine by rotating the horizontal tower on the hinge pins to vertical and pinned. The control cable is threaded through the alternator 51. The drive shaft 16 is attached to the alternator 51.

A mercury rotary contactor 17 is provided at the bottom end of the drive shaft 16, wherein a control cable is connected to the mercury rotary contactor 17 which is attached to the bottom of the alternator 51. The other end of the mercury rotary contractor 17 is connected to the control 52. Lights and/or strobes 18 are attached at the outer ends of the spokes 41.

Magnetic levitation bearings 19 may be used by removing the cover on the top end of the vertical hub 21, remove the angular bearings assembly and replace them with magnetic levitation bearings 19. Magnetic levitation bearings 19, which are the bearingless magnetic levitation bearings, are also mounted on the hub cover. The cover is attached to the top end of the vertical hub 21. Attachments are mainly nut and bolts. The magnetic levitation for thrust bearings is preferred at the top or end of the spindle 15. The thrust bearing may be of any design and located at the top, anywhere in the middle or at the bottom.

The rotation speed causing centrifugal force on the wings is not difficult to design for, since the rotational speed is not great, especially for large turbines. The megawatt turbine is expected to have a sixty foot diameter. According to the research, a floating turbine, that is; a turbine producing no power consequently, no load, rotates with a peripheral speed about 25% greater that the wind speed. The sixty foot diameter turbine has 188.5 foot circumference. In a 100 mile per hour wind, the rotor would turn at fifty eight RPM. Under load, producing power, the rotational speed would be thirty RPM.

Accordingly, the wind energy can be further transformed into heat energy for storage. The heat energy can be stored in a thermal battery assembly which comprises a ceramic tank containing molten salt. It is worth mentioning that solid salt is an insulator, however, the molten salt is conductor. The molten salt at 1000° C. will be stored in the ceramic tank to store the thermal energy. The thermal battery assembly, having the tank 80 feet in diameter by 30 feet tall, would store 100 megawatt of electrical energy for 4 hours. It is known that 3413 BTUs equals 1 KWhr. Base on 90% efficiency, 100 MW for four hours equals 1,516,888,888 BTUs. The volume of the tank is 150796.32 cubic feet. Salt weight 48 pounds per cubic feet so there is 7,238,223.3 pounds of salt in the tank. The temperature differential between cold and hot is 278° C. or 501° F. 1,516,888K BTUs/151K cubic feet=10,046 BTUs per cubic foot or 36.14 BTUs per degree C. or 20.05 BTUs per degree F. Also, one pound of salt equals 209.29 BTUs in this scenario. With this scenario, renewables could replace nuclear and coal.

NASA has caused there to be thermal insulators capable of 30,000 Fahrenheit insulation, the infamous tiles on the underside of space shuttles. This kind of material can insulate the stored molten salt so that very little of the energy is lost due to storage. Useful thermal storages can remain for weeks. This study is based on the Crescent Dunes Energy Project near Tonopah, Nev.

More importantly, the thermal battery assembly can be transported from places to places easily. Therefore, even though the system of the present invention is located away from the designated location, the thermal battery assembly can be transported from the location where the system is to the designated location.

This machine requires a major manufacturing facility to produce the one megawatt machines which is the preferred size. Assembly and installation is described above. It is worth mentioning that the system of the present invention is closed and very visible and rotating about the vertical hub 21 with a peripheral speed slightly faster than the wind. The system of the present invention does not kill birds. In fact, swallows have nested and raised a family in the cooling blower of the prototype. The system of the present invention is light at the top allowing assembly on the ground and erection with self contained rigging. On the other hand, HAWTs require huge cranes and expensive equipment to construct and service the machine. The system of the present invention floats on magnetic levitation, no bearing is required. Also, no maintenance is required. The system of the present invention transmits power through the vertical hub 21 and drive shaft 16 to a large diameter alternator at ground level without a gear box. As a result, no maintenance is required the gear box-less system. It is developed a power regulator controller applicable to any size turbine. It is also developed a modular alternator allowing for manufacturing of three sizes of modules that can be used on any size turbines of 1 KW through 10 KW, 10 KW through 100 KW, and 100 KW through 1 MW, in conjunction with the regulator to produce power AC or DC 24 Volt to 4160 Volt, all without a speed increasing gear box.

This is an energy device harvesting electrical, fluid or mechanical power from the wind. The problem is insufficient electrical energy produced to make the USA energy independent and reduce fossil fuel use, coal, oil, gas, and nuclear for electrical energy in the USA as well as the world.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A proportional moving air power transmission and energy collection and control system, comprising:
   a tower having an upper tower section and a lower base section;
   a hub assembly which comprises a vertical spindle affixedly provided at said upper tower section of said tower, a vertical hub coaxially supported to be rotated about said spindle, a pitch drive ring coaxially and rotatably coupled around said vertical hub, and a drive shaft coaxially provided in said spindle and attached to said vertical hub;
   a wing assembly, which is supported at said tower section of said tower, comprising a plurality of wings, each of said wings having a blunt leading end and a pointy trailing end and defining an outer surface and an inner surface;
   a plurality of wing connection units radially and outwardly extended from said vertical hub to couple with said wings respectively so as to support said wings around said hub assembly in 360°, wherein each of said wing connection units comprises a spoke and a link, wherein each of said spokes has an inner end affixed to said vertical hub in a radial direction thereof and an outer end pivotally coupled to said wing, wherein each of said links has an inner end pivotally coupled at said pitch drive ring and an outer end pivotally coupled to said wing, wherein said wing connection units are actuated to selectively adjust pitches of said wings and to move said wing assembly between a fully opened position and a fully closed position, wherein in said fully opened position, said pitch drive ring is rotated around said vertical hub at one direction to concurrently drive said links at a position that said trailing ends of said wings are concurrently moved away from said vertical hub to a diameter of said wing assembly, wherein in said fully closed position, said pitch drive ring is rotated around said vertical hub at an opposed direction to concurrently drive said links at a position that said trailing ends of said wings are concurrently moved toward said vertical hub, such that said wings are overlapped with each other end-to-end at a position that said trailing end of said wing is moved to overlap with said leading end of said adjacent wing to form a hollow cylinder-like structure to furl, such that the diameter of said wing assembly is minimized for facing the wind at all direction; and
   an energy collection unit located at said base section of said tower and operatively linked to said vertical hub for transforming said wind energy into a renewable energy.

2. The system, as recited in claim 1, wherein each of said wings has a width between said inner surface and said outer surface that said width at said leading end is larger than said width at said trailing end.

3. The system, as recited in claim 2, wherein said inner surface of each of said wings has a concave portion extended from said trailing end and a convex portion extended from said leading end to said concave portion.

4. The system, as recited in claim 3, wherein said outer surface of each of said wings is a convex surface.

5. The system, as recited in claim 4, wherein said hub assembly further comprises a bearing unit coaxially coupled between said pitch drive ring and said vertical hub to selectively adjust said pitches of said wings.

6. The system, as recited in claim 5, wherein said outer end of said spoke is pivotally connected to said wing close to said leading end thereof while said outer end of said link is pivotally connected to said wing close to said trailing end thereof, so as to selectively adjust said pitch of said wing.

7. The system, as recited in claim 6, wherein said energy collection unit comprises an alternator operatively linked to said drive shaft for transforming mechanical energy produced by said vertical hub and said wing assembly into an AC electrical energy, and a control operatively linked to said alternator for converting said AC electrical energy into a DC electrical energy.

8. The system, as recited in claim 1, wherein said inner surface of each of said wings has a concave portion extended from said trailing end and a convex portion extended from said leading end to said concave portion.

9. The system, as recited in claim 1, wherein said outer surface of each of said wings is a convex surface.

10. The system, as recited in claim 1, wherein said hub assembly further comprises a bearing unit coaxially coupled between said pitch drive ring and said vertical hub to selectively adjust said pitches of said wings.

11. The system, as recited in claim 10, wherein said outer end of said spoke is pivotally connected to said wing close to said leading end thereof while said outer end of said link is pivotally connected to said wing close to said trailing end thereof, so as to selectively adjust said pitch of said wing.

12. The system, as recited in claim 1, wherein said energy collection unit comprises an alternator operatively linked to said drive shaft for transforming mechanical energy produced by said vertical hub and said wing assembly into an AC electrical energy, and a control operatively linked to said alternator for converting said AC electrical energy into a DC electrical energy.

13. A method of transforming wind energy into renewable energy via a proportional moving air power transmission and energy collection and control system, comprising the steps of:
   (a) installing a tower, said tower having an upper tower section and a lower base section;
   (b) vertically extending a vertical hub of a hub assembly from a top of said tower section of said tower, and coaxially and rotatably coupling a pitch drive ring around said vertical hub;
   (c) supporting a plurality of wings of a wing assembly at said tower section of said tower, each of said wings having a blunt leading end and a pointy trailing end and defining an outer surface and an inner surface;
   (d) radially and outwardly extending a plurality of wing connection units from said vertical hub to couple with said wings respectively so as to support said wings around said vertical hub in 360°, wherein the step (d) further comprises the steps of:

(d.1) radially extending a spoke of each of said wing connection units from said vertical hub to pivotally couple at said corresponding wing to support said wing around said vertical hub, wherein each of said spokes has an inner end affixed to said vertical hub in a radial direction thereof and an outer end pivotally coupled to said wing; and (d.2) pivotally extending a link of each of said wing connection units from said pitch drive ring to pivotally couple at said corresponding wing to selectively adjust said pitch of said wing when said pitch drive ring is rotated around said vertical hub, wherein each of said links has an inner end pivotally coupled at said pitch drive ring and an outer end pivotally coupled to said wing;

(e) in a low-wind environment, moving said wing assembly in a fully opened position that said trailing end of each of said wings is moved away from said vertical hub via said wing connection unit to maximize a diameter of said wing assembly to drive said vertical hub to rotate;

(f) in a high-wind environment, moving said wing assembly in a fully closed position that said wings are overlapped with each other end-to-end by overlapping said trailing end of said wing with said leading end of said adjacent wing to form a hollow cylinder-like structure to furl, such that the diameter of said wing assembly is minimized;

(g) in a mid-wind environment, moving said wing assembly between said fully opened position and said fully closed position to selectively adjust pitches of said wings in response to a wind speed to drive said the diameter of said wing assembly is minimized to rotate; and (h) transforming mechanical energy produced by said vertical hub in response to said wind into said renewable energy via an energy collection unit located at said base section of said tower.

14. The method, as recited in claim 13, wherein said step (c) further comprises the steps of:

(c.1) configuring each of said wings to have a width between said inner surface and said outer surface that said width at said leading end is larger than said width at said trailing end;

(c.2) configuring said inner surface of each of said wings to have a concave portion extended from said trailing end and a convex portion extended from said leading end to said concave portion; and (c.3) configuring said outer surface of each of said wings to have a convex surface.

15. The method, as recited in claim 14, wherein said step (b) further comprises a step of coaxially and rotatably coupling a bearing unit between said pitch drive ring and said vertical hub to enable said pitch drive ring to rotate around said vertical hub.

16. The method, as recited in claim 15, wherein said step (d) further comprises the steps of:

(d.1) pivotally coupling said outer end of said spoke to said wing close to said leading end thereof; and (d.2) pivotally coupling said outer end of said link to said wing close to said trailing end thereof.

17. The method, as recited in claim 16, wherein said step (h) further comprises the steps of:

(h.1) operatively linking an alternator to said drive shaft for transforming said mechanical energy produced by said vertical hub into an AC electrical energy; and (h.2) operatively linking a control to said alternator for converting said AC electrical energy into a DC electrical energy.

18. The method, as recited in claim 13, wherein said step (b) further comprises a step of coaxially and rotatably coupling a bearing unit between said pitch drive ring and said vertical hub.

19. The method, as recited in claim 18, wherein said step (d) further comprises the steps of:

(d.1) pivotally coupling said outer end of said spoke to said wing close to said leading end thereof; and (d.2) pivotally coupling said outer end of said link to said wing close to said trailing end thereof.

20. The method, as recited in claim 13, wherein said step (h) further comprises the steps of:

(h.1) operatively linking an alternator to said drive shaft for transforming said mechanical energy produced by said vertical hub into an AC electrical energy; and (h.2) operatively linking a control to said alternator for converting said AC electrical energy into a DC electrical energy.

\* \* \* \* \*